United States Patent
Senick (10) Patent No.: US 11,940,071 B1
(45) Date of Patent: Mar. 26, 2024

(54) PORTABLE CARRIER DEVICE FOR RV SEWER HOSES

(71) Applicant: Brad Eric Senick, Walnutport, PA (US)

(72) Inventor: Brad Eric Senick, Walnutport, PA (US)

( * ) Notice: Subject to any disclaimer, the term of this patent is extended or adjusted under 35 U.S.C. 154(b) by 0 days.

(21) Appl. No.: 18/189,697

(22) Filed: Mar. 24, 2023

Related U.S. Application Data (60) Provisional application No. 63/267,123, filed on Jan. 25, 2022.

(51) Int. Cl.
  *F16L 3/12* (2006.01)
  *F16L 3/00* (2006.01)

(52) U.S. Cl.
  CPC ............ *F16L 3/1211* (2013.01); *F16L 3/003* (2013.01); *F16L 3/1218* (2013.01); *F16L 3/12* (2013.01)

(58) Field of Classification Search
  CPC . F16L 3/1211; F16L 3/003; F16L 3/12; F16L 3/1218
  USPC .............. 248/49, 89–93, 76, 80, 83, 85
  See application file for complete search history.

(56) References Cited

U.S. PATENT DOCUMENTS

| | | | | |
|---|---|---|---|---|
| 2,736,525 A | * | 2/1956 | Jones | F16L 3/00 248/168 |
| 3,493,204 A | | 2/1970 | Prouty | |
| 3,554,474 A | * | 1/1971 | Davies | F16L 3/1058 248/83 |
| 3,730,228 A | * | 5/1973 | Gibbs, Sr. | E03F 1/008 138/155 |
| 3,810,490 A | * | 5/1974 | Ludwick | F16L 3/00 138/110 |
| 3,819,137 A | * | 6/1974 | Smith | F16L 3/16 248/167 |
| 4,133,347 A | | 1/1979 | Mercer | |
| 4,169,571 A | * | 10/1979 | Duggan | F16L 3/00 248/439 |
| 4,194,711 A | * | 3/1980 | Winton | F16L 3/26 248/83 |
| 4,223,702 A | * | 9/1980 | Cook | F16L 7/00 138/155 |
| 4,228,978 A | * | 10/1980 | Rand | E03F 1/00 138/121 |
| 4,403,758 A | * | 9/1983 | Burt | F16L 3/26 248/83 |
| 4,844,121 A | | 7/1989 | Duke | |
| 5,033,702 A | | 7/1991 | Robbins | |

(Continued)

*Primary Examiner* — Nkeisha Smith
(74) *Attorney, Agent, or Firm* — Dunlap Bennett & Ludwig, PLLC (57) ABSTRACT

A portable hose carrier for RV sewer hoses is disclosed. The portable hose carrier has an outer tube, an inner tube within the outer tube, and a clamp encircling one end of the outer tube. When the clamp is open, the inner tube may telescopically slide within the outer tube. When closed, the clamp fastens the inner tube and outer tube together so long as some portion of the inner tube remains within the outer tube. A relief slot in the outer tube allows the outer tube's diameter and circumference to be reduced when the clamp is in the closed position. Each of the inner tube and outer tube has a respective endcap at opposing ends of the inner and outer tubes. At least two inner legs and two outer legs are rotatably attached to the end cap of the inner tube and outer tube, respectively.

16 Claims, 5 Drawing Sheets

(56) References Cited

U.S. PATENT DOCUMENTS

| | | | | |
|---|---|---|---|---|
| 5,067,679 A | * | 11/1991 | Courtney | F16L 3/26 248/75 |
| 5,323,813 A | * | 6/1994 | Barrett | F16L 27/12 138/155 |
| 5,324,001 A | | 6/1994 | Duke | |
| 5,417,460 A | * | 5/1995 | Lunder | F16L 33/08 285/903 |
| 5,431,455 A | * | 7/1995 | Seely | E03F 1/008 285/404 |
| 5,511,609 A | * | 4/1996 | Tyler | F28F 19/002 122/DIG. 13 |
| 5,788,193 A | | 8/1998 | Hilbert | |
| 5,897,083 A | | 4/1999 | Johnson | |
| 5,904,183 A | | 5/1999 | Leech | |
| 5,988,221 A | | 11/1999 | Walker | |
| 6,003,819 A | * | 12/1999 | Hall | F16L 3/26 248/80 |
| 6,123,367 A | * | 9/2000 | Miller | B60R 15/00 285/376 |
| 6,223,767 B1 | | 5/2001 | Otis | |
| 7,036,524 B2 | * | 5/2006 | Kennedy | B60R 15/04 137/355.16 |
| 7,926,768 B2 | * | 4/2011 | Prest | E03F 1/008 248/83 |
| 8,469,049 B2 | * | 6/2013 | Garceau | B60R 15/04 137/355.16 |
| 8,882,058 B2 | * | 11/2014 | Marshall | F16L 3/20 248/62 |
| 8,919,704 B2 | * | 12/2014 | Lee | H02G 3/263 248/62 |
| 8,938,821 B2 | * | 1/2015 | Higgins | E03D 11/13 4/301 |
| 9,211,847 B1 | | 12/2015 | Cox et al. | |
| 11,435,010 B1 | * | 9/2022 | Bridges | F16L 3/1075 |
| 11,441,704 B2 | * | 9/2022 | Garza, Jr. | F16L 1/003 |
| 11,759,665 B2 | * | 9/2023 | Cambria | B05B 15/63 239/526 |
| 2006/0090920 A1 | * | 5/2006 | Fujita | B60R 16/0207 174/72 A |
| 2007/0235096 A1 | * | 10/2007 | Nielsen | F16L 3/01 137/899 |
| 2022/0170572 A1 | * | 6/2022 | Heib | F16L 3/26 |

\* cited by examiner

PORTABLE CARRIER DEVICE FOR RV SEWER HOSES

CROSS-REFERENCE TO RELATED APPLICATION

This application claims the benefit of priority of U.S. provisional application No. 63/267,123, filed Jan. 25, 2022, the contents of which are herein incorporated by reference.

BACKGROUND OF THE INVENTION

The present invention relates to recreational vehicles (RVs) and, more particularly, to an extendable RV waste hose carrier which is detachable and stands on its own.

All RV sewer/waste hoses are flexible, which makes them difficult to keep straight and keep waste flowing. It also makes them difficult to keep flowing in one direction and prevent sags or traps in the hose.

One conventional solution is to provide an accordion-style holder for the waste carrier hose. However, accordion-style holders tend to break or come apart easily. They also take up substantial space and require storage inside the RV, which is usually limited and at a premium. Also, because there are gaps in the accordion, sags and clogs in the sewer hoses frequently occur. Further, the pitch or flow is not adjustable, with the flow being constant based on the size of the holder. This results in backflow in the hose if the ground is not flat or graded downward. They also require the user to remove the hose for cleaning. In summary, accordion style holders are difficult and time consuming to set up.

As can be seen, there is a need for an extendable RV waste hose carrier which is detachable and stands on its own.

SUMMARY OF THE INVENTION

In one aspect of the present invention, a portable waste hose carrier device comprises at least one outer tube and at least one inner tube, wherein the inner tube is coupled to the outer tube via at least one first clamp positioned at a first outer tube end. The first clamp has at least one open position and one closed position. The inner tube is telescopically coupled to the outer tube such that at least a portion of the inner tube slides within the outer tube when the first clamp is in the open position and the inner tube is securely fastened relative to the outer tube when the first clamp is in the closed position. The inner tube may be inserted into an inner end cap at a first inner tube end, and the outer tube may be inserted into an outer end cap at a second outer tube end. Further, a plurality of legs, including at least two inner legs and two outer legs, are coupled to the inner end cap and outer end cap, respectively. Each of the plurality of legs may rotate on a plane normal to the radius of the respective tube to which each leg is coupled. Further, the inner legs may be shorter in length than the outer legs, the outer legs may be shorter than the inner legs, or each leg may have the same length depending on a user's desired positioning for the portable waste hose carrier device. The user may rotate each leg and secure each leg into a desired position and thus adjust the height or overall position of the portable waste hose carrier device.

In another aspect of the invention, a relief slot is formed in a relief strip that may be embedded within a dovetail cut in the outer tube. The relief strip forms a portion of the circumference of the outer tube along portion of the outer tube's length. The relief slot extends away from the first outer tube end along at least a portion of a length of the outer tube. When the first clamp is moved to the closed position, the relief slot allows the diameter of the outer tube to be reduced such that the outer tube and inner tube are securely fastened relative to one another.

In another aspect of the invention, the first clamp may substantially encircle the first outer tube end, and may include at least two tabs. The two tabs may be on opposite ends of the first clamp such that, when the first clamp encircles the first outer tube end, the two tabs are substantially adjacent to one another. Each of the at least two tabs may have a threaded hole configured to cooperate with a threaded knob. The threaded knob may be inserted into both tabs simultaneously so that the threaded knob may be twisted and cause the first clamp to move between the open and closed positions.

In another aspect of the invention, the inner end cap has at least two inner bosses configured to be the coupling point for the inner legs, while the outer end cap includes at least two outer bosses configured to be the coupling point for the outer legs. The inner bosses and outer bosses may each comprise a threaded hole that extends through the inner or outer end cap, respectively, from an exterior surface of the inner and outer tubes to an interior surface of the inner and outer tubes. The inner and outer tubes may include holes that correspond to and align with the threaded holes of the inner and outer bosses. Each of the plurality of legs may include a threaded hole adjacent one end of each leg, with each of the threaded leg holes cooperating with a respective threaded boss hole and tube end hole to accommodate a threaded knob. When in place, the threaded knobs secure the inner end cap to the inner tube and the outer end cap to the outer tube. Further, the threaded knobs may be twisted to securely fasten one of the plurality of legs into a desired position or may be loosened to allow the leg to rotate.

At least one boss with a threaded hole may be formed in the first clamp, such that a threaded knob may securely fasten one of the plurality of legs to the clamp boss. Alternatively, a tripod having a threaded mounting screw, may be inserted into the threaded hole of the inner, outer, or clamp bosses.

In another aspect of the invention, at least one holder, such as an elastic grommet, may be securely fastened within the inner and outer tubes. The elastic grommet may be located adjacent one of the inner or outer end cap. Further, the elastic grommet may include a central orifice configured to allow a waste hose of an RV to be pulled through the central orifice and into a desired position, whereupon the elastic grommet retains the waste hose in the desired position.

In another aspect of the invention, each of the inner and outer end caps comprises at least one securement arch. The securement arch is configured to accommodate a strap, rope, or similarly flexible and elongate securement device to secure the portable waste hose carrier device to an RV or other vehicle. The portable waste hose carrier device may be secured in a storage position via attachment of strap to the securement arch and any number of points on the RV, including, but not limited to, a bumper, a ladder, trailer tongue, a rack or any similarly convenient location for a user.

In another aspect of the invention, a user may unstrap the portable waste hose carrier device from a storage position, extend the inner and outer tubes, and extend the waste hose both within and outside of the inner and outer tubes. The user may then set the desired height by adjusting the positions of each of the plurality of legs. Finally, the waste hose can be connected to the RV and the portable waste hose carrier device used. When done, one may simply strap the portable waste hose carrier device, with the waste hose inside, back in its storage location. Because the portable waste hose carrier device is stored outside the RV, valuable indoor space is free to be used otherwise.

In another aspect of the invention, the portable waste hose carrier device may be made or fabricated as follows. The inner and outer tubes may comprise suitably strong and durable plastics, such as polyvinyl chloride (PVC). The plurality of legs may be made of plastic or metal. The relief strip may be made from a durable and resilient material, such as aluminum. Similarly, the inner and outer end caps and the first clamp may be made of strong and durable materials, such as metals or hard plastics. The inner and outer grommets may comprise a strong elastic material, such as rubber. The straps may be made of rubber strapping or nylon strapping.

The present invention provides many advantages over the prior art. For example, it permits a user to clean the waste hose in the carrier. The present invention reduces time and effort for set up and clean up. It attaches quickly to an RV and is a storage place for the waste hose when not in use. Additionally, the present invention allows the flow of waste to be adjusted based on the pitch of the ground or height of the RV. Because it expands and retracts, the present invention can also be adjusted to the exact length needed.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention provides a portable carrier/support device for RV sewer/waste hoses and selectively extends and/or retracts depending on the size needed at each destination or depending on the size of the sewer hose. As used herein, the term RV is intended to encompass various types of motor vehicles or trailers equipped with some amenities of a home. Embodiments of the present invention are solid and straight, which keeps the sewer line from sagging, kinking, clogging, and backflowing. It is also self-supported/free-standing and is adjustable such that proper pitch can be determined quickly depending on ground level at the destination. The product attaches to an RV quickly for transport or when not in use and it detaches quickly when needed.

Prior to the present invention, the only products available to hold an RV sewer line straight while in use were accordion style. The present invention allows the sewer hose to stay straight because it is a solid tube. It also serves as a storage place for the hose when not in use. The adjustable feet on the present invention allow the flow to be adjusted depending on the grade or level of the ground. The present invention also expands or retracts depending on the distance of the main sewer connection at the RV's destination and the RV's sewer hose.

Figure 1:
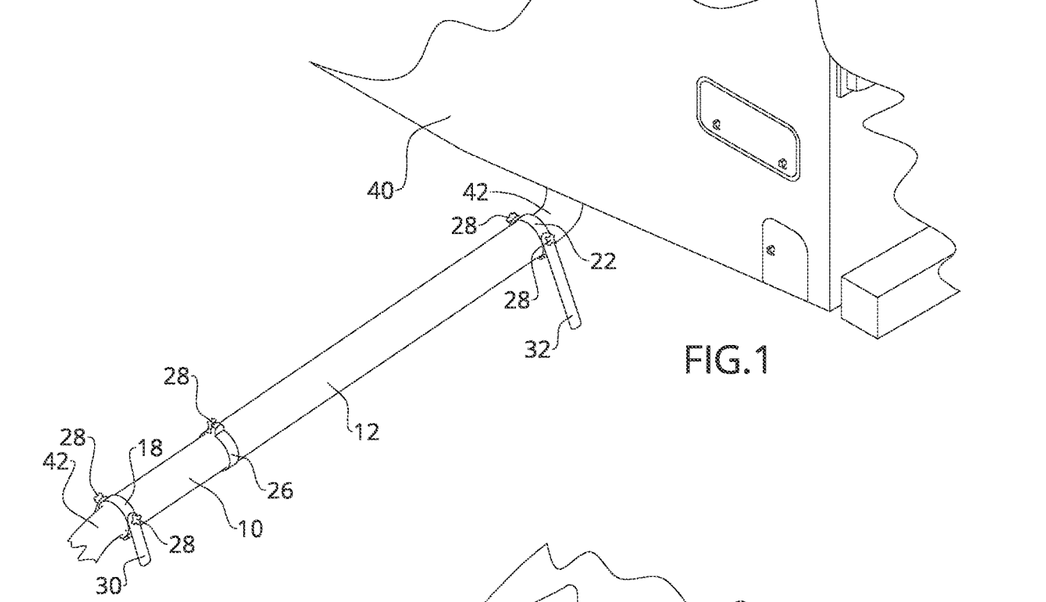
FIG. 1 is a perspective view of a portable carrier device in use according to an embodiment of the present invention.
Figure 2:
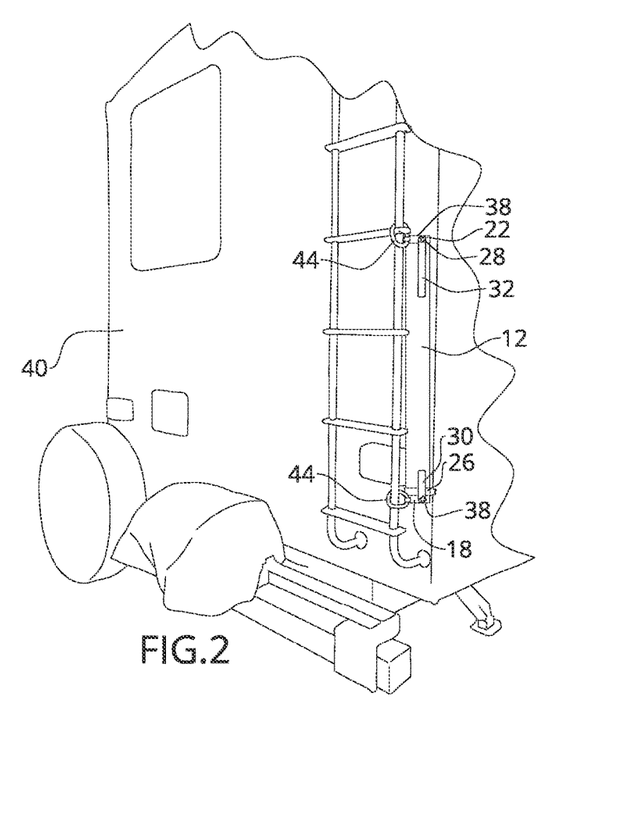
FIG. 2 is a perspective view of thereof, shown in a storage position.
Figures 3, 4:
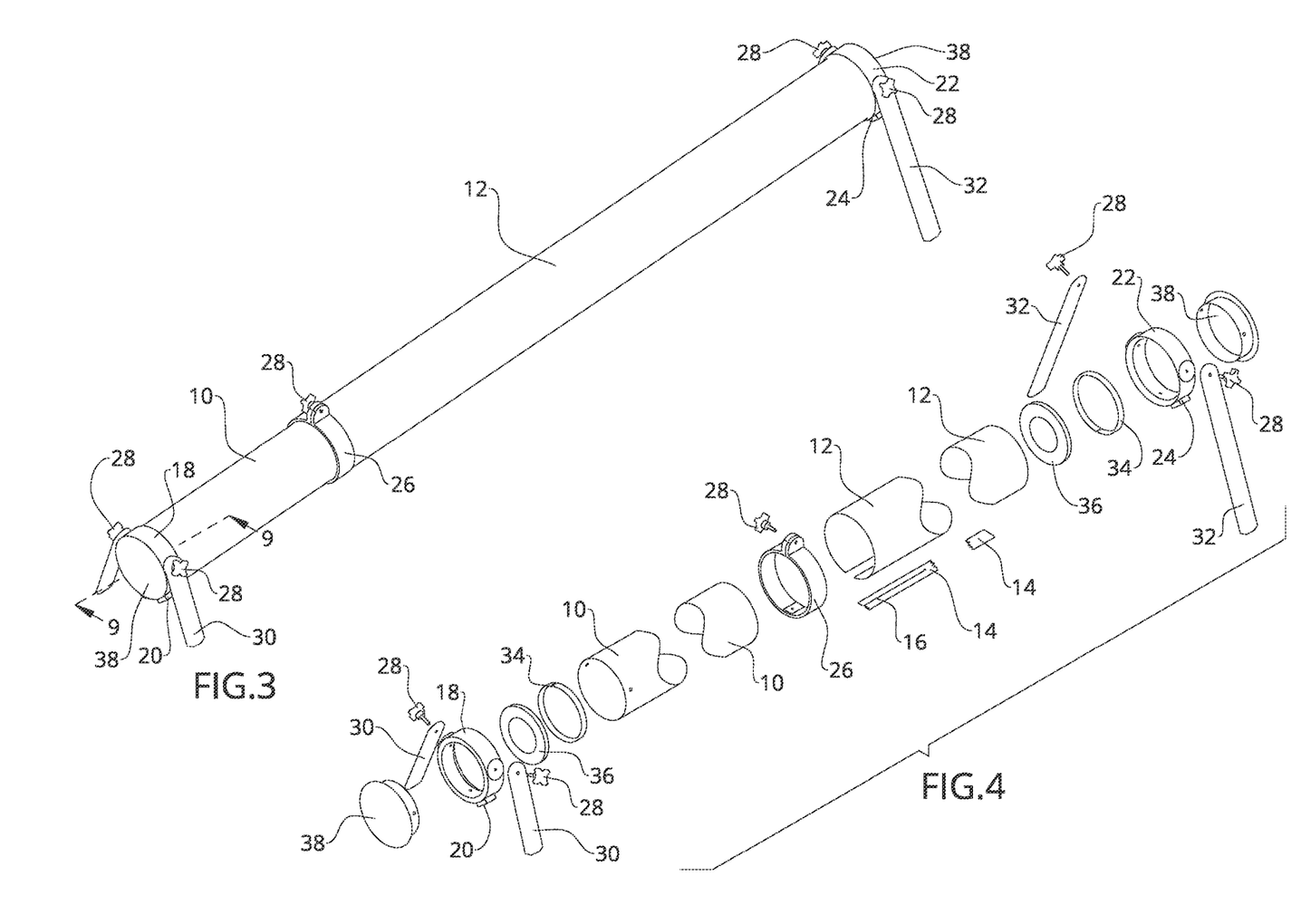
FIG. 3 is another perspective view thereof.
FIG. 4 is an exploded perspective view thereof.
Figure 5:
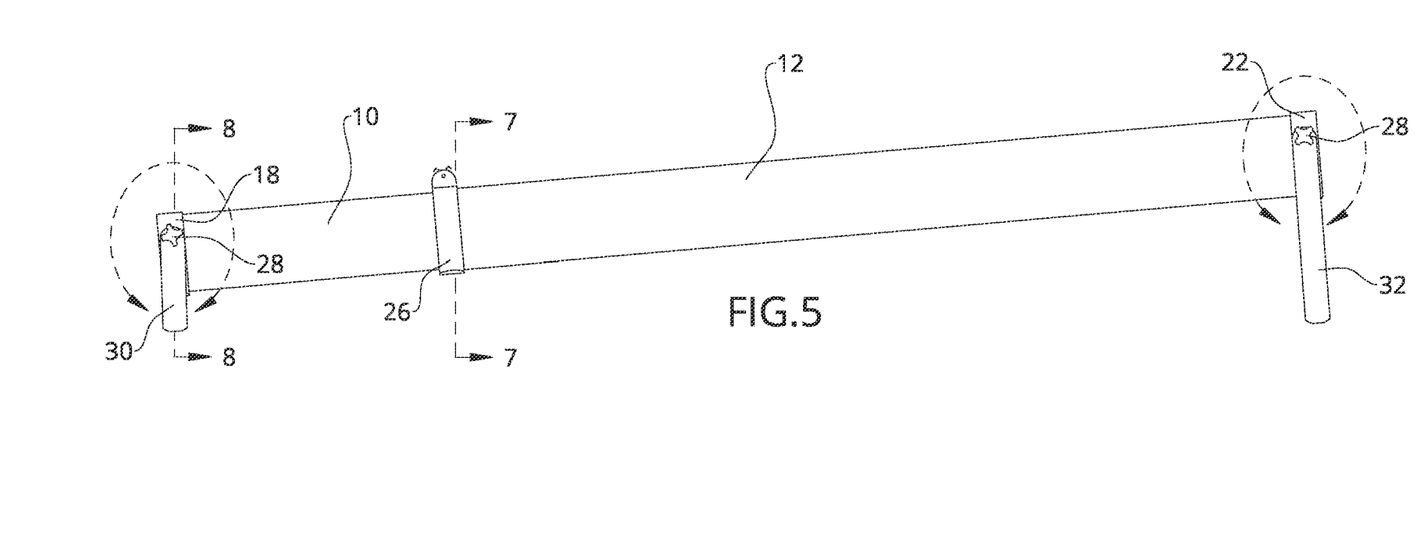
FIG. 5 is a side elevation view thereof showing leg adjustment.
Figure 6:
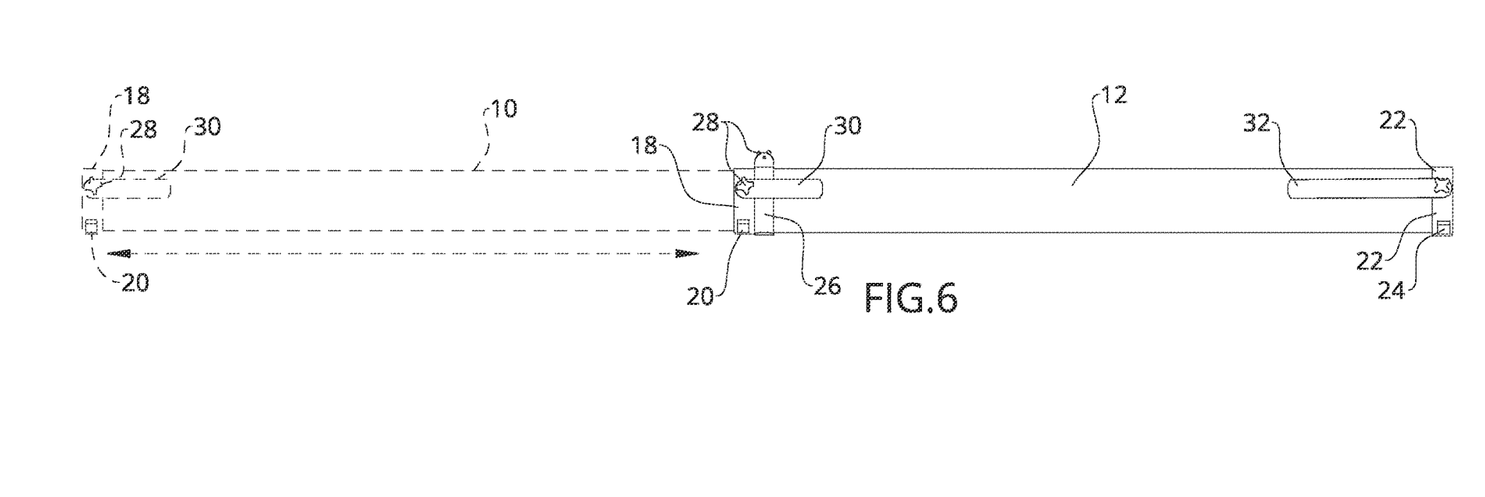
FIG. 6 is a side elevation view thereof showing length adjustment.
Figure 7:
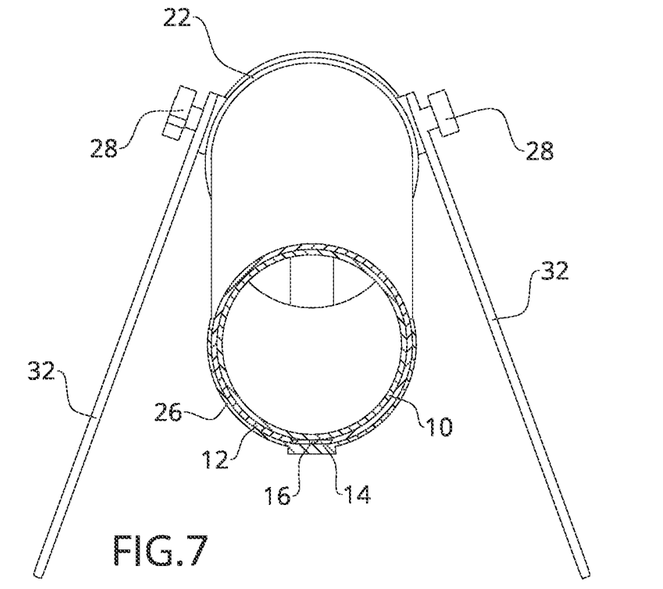
FIG. 7 is a cross-sectional view thereof taken along line 7-7 in FIG. 5.
Figure 8:
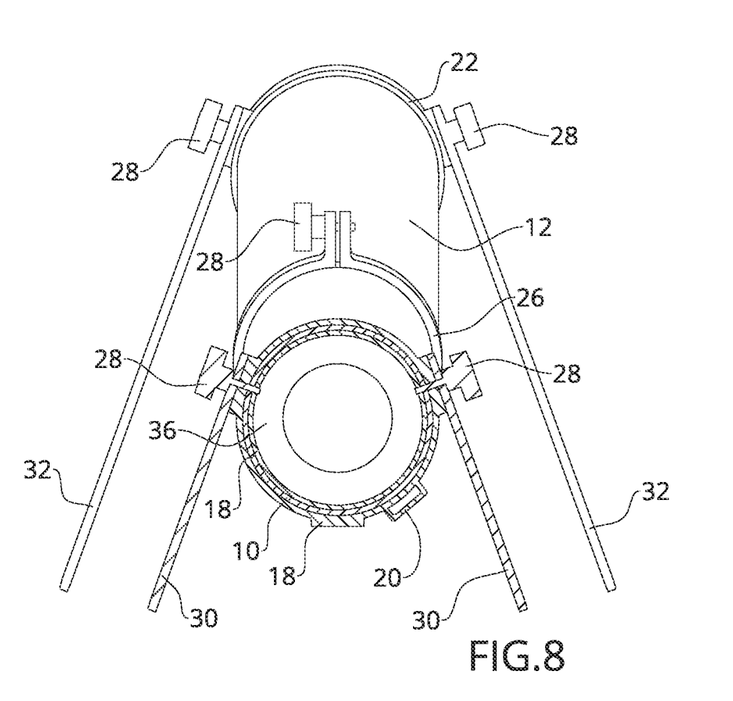
FIG. 8 is a cross-sectional view thereof taken along line 8-8 in FIG. 5.
Figure 9:
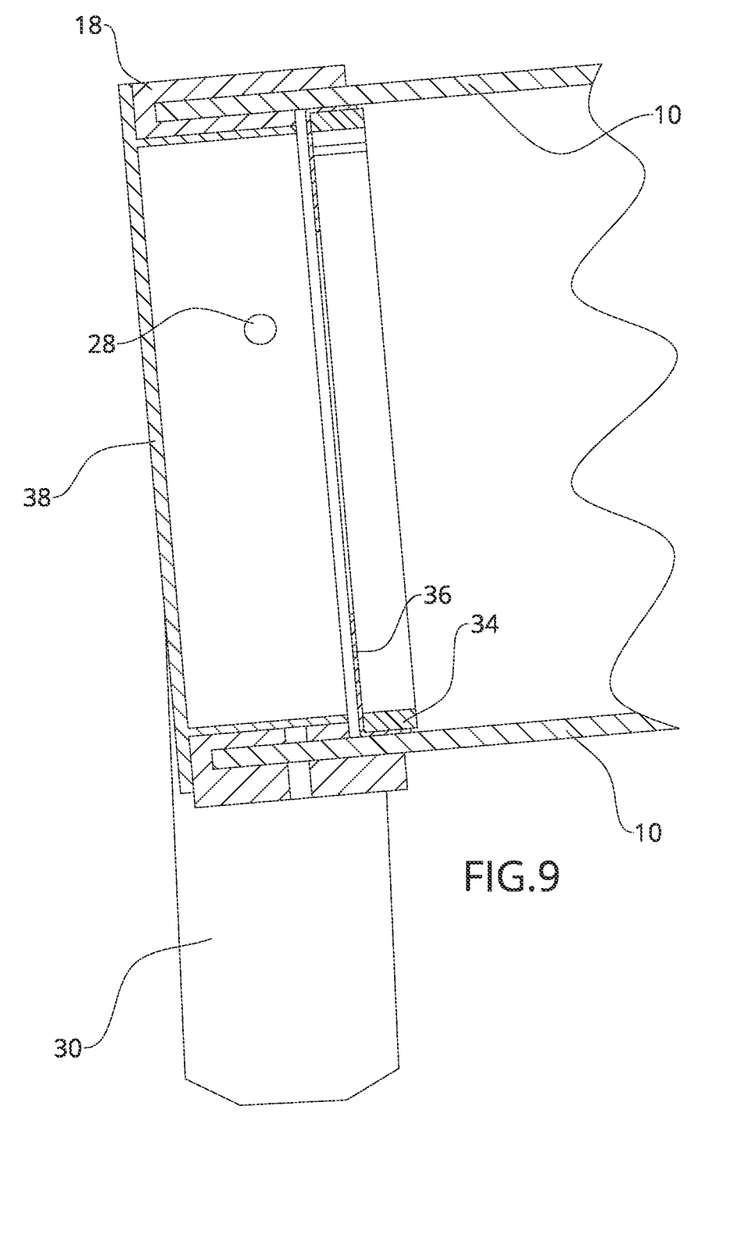
FIG. 9 is a cross-sectional view thereof taken along line 9-9 in FIG. 3.

Referring now to FIGS. 1-9, an outer tube 12, formed from, for example, plastic, is provided. In certain embodiments, the outer tube 12 may be approximately inches in diameter and approximately 6 feet in length. An inner tube 10, formed from, for example, plastic, is provided. In certain embodiments, the inner tube 10 may be slightly less than 5 inches in diameter and approximately 6.5 feet in length. The inner tube 10 may move telescopically within the outer tube 12 along a portion of the inner tube's 10 length.

The inner tube 10 is described as such because of its telescoping relationship with the outer tube 12. It will be understood that in use and full extension, the inner tube 10 is not actually within the outer tube 12 in any substantial respect. Likewise, it will be understood that the RV waste hose 42 does actually reside as its own kind of interior tube within the embodiments described herein, though to be clear, it is not what the present description calls the inner tube 10.

A first inner tube end is inserted into a slot formed within an annular inner end cap 18. The first inner tube end and inner end cap 18 may include corresponding threaded holes that align and cooperate with an associated threaded knob 28. The threaded knob 28 may then be inserted into the corresponding threaded holes to secure the first inner tube end to the inner end cap 18.

Similarly, a second outer tube end is inserted into a slot formed within an annular outer end cap 22. The second outer tube end and outer end cap 22 may include corresponding threaded holes that align and cooperate with an associated threaded knob 28. The threaded knob 28 may then be inserted into the corresponding threaded holes to secure the second outer tube end to the outer end cap 22.

A clamp 26 including two tabs forming opposing ends of the clamp 26 substantially encircles a first outer tube end such that the two tabs are adjacent to one another. Each of the two tabs includes a threaded hole that cooperates with and accommodates an associated threaded knob 28. The threaded knob 28 cooperates with the two tabs to move the clamp 26 between an open position and a closed position. When the clamp 26 is in the open position, the inner tube 10 slides freely within the outer tube 12. When the clamp 26 is in the closed position, the inner tube and outer tube 12 are firmly held in place relative to one another.

The outer tube 12 may include a relief strip 14 formed from, for example, aluminum. The relief strip 14 extends away from the first outer tube end and forms a portion of the outer tube's 12 circumference for at least a portion of the outer tube's 12 length. A relief slot 16 is formed in the relief strip 14 at the first outer tube end and extends along a portion of the relief strip's 14 length. When the clamp 26 is in the closed position, the relief slot 16 allows the diameter and circumference of the outer tube 12 to reduce, thereby compressing the outer tube 12 against the inner tube 10 and securing the relative positions of the outer tube 12 and inner tube 10.

A set of outer legs 32 and a set of inner legs 30 are provided at the second outer tube end and first inner tube end, respectively. The outer and inner legs 32, 30 include threaded holes at first ends of each of the legs 32, 30. The threaded holes of the outer and inner legs 32, 30 cooperate with the threaded holes and associated threaded knobs 28 of the outer and inner end caps 22, 18, respectively. The outer and inner legs 32, 30 are thus able to rotate on a plane perpendicular to a radius of the outer and inner tubes 12, 10 when the associated threaded knob 28 is not fully tightened against a respective one of the outer and inner legs 32, 30. Alternatively, sets of legs may be formed as tripods that may be folded and height adjustable.

The outer and inner end caps 22, 18 include multiple outer and inner bosses, respectively. The outer and inner bosses are located such that the threaded holes in the outer and inner end caps 22, 18 pass through a center of each outer and inner boss. The outer and inner bosses thus cooperate with threaded knobs 28 and the outer and inner legs 32, 30 to adjust the height and position of the portable waste hose carrier device. Additionally, the outer and inner bosses and outer and inner legs 32, 30 may include corresponding teeth to better lock the outer and inner legs 32, 30 into a desired position.

Within each of the inner and outer tubes 10, 12, an elastic grommet 36 may be located adjacent to the inner and outer end caps 18, 22. The elastic grommet 36 may be secured within the inner and outer tubes 10, 12 by virtue of a grommet retaining ring 34. The elastic grommet 36 includes a central orifice to allow a waste hose 42 to be urged through the elastic grommet 36. Once in the desired position, the waste hose 42 is held in place by the elastic grommet 36.

Straps 44 (or ties) are coupled to securement arches 24, 20 formed on each of the outer and inner ends caps 22, 18. The straps may then be used to hold the portable waste hose carrier device to a bumper, a ladder, or another portion of an RV 40.

In use, a standard RV waste hose 42 is first inserted inside outer and inner tubes 12, 10 where the waste hose 42 can remain. The elastic grommets 36 prevent the waste hose 42 from moving or falling out of the outer and inner tubes 12, 10. The straps 44 hold all components and the waste hose 42 onto the RV 40 (e.g., on the ladder, bumper, trailer tongue) when not in use. When in use, the outer and inner tubes 12, 10 can be adjusted to the desired length via adjustment of the clamp 26 and extension or contraction of the outer and inner tubes 12, 10, relative to one another. The position of the waste hose 42 within the elastic grommets 36 may also be adjusted if desired. The sets of outer and inner legs 32, 30 are separately rotated and positioned to set a desired height for each end of the portable waste hose carrier device. The elastic grommets 36 may also hold the waste hose 42 in place for easy cleaning. When done using the present invention, end plugs 38 may be placed into open ends of the outer and inner tubes 12, 10, and the straps 44 may be used again to attach the present invention to the RV's 40 bumper or ladder. In certain embodiments, the outer and inner legs 32, 30 may be folded or rotated to lie flat against or adjacent to the outer and inner tubes 12, 10 to make it more compact and storable.

The present invention has been described in terms of exemplary embodiments solely for the purpose of illustration. For example, while the present invention has been discussed in terms of RV waste disposal, the portable waste hose carrier device can likewise be used to redirect fluid flows through other similar hoses, such as the fluid flow through a downspout on a home. Persons skilled in the art will recognize from this description that the invention is not limited to the embodiments described but may be practiced with modifications and alterations limited only by the spirit and scope of the appended claims.

What is claimed is:

1. A portable carrier device comprising:
   at least one outer tube and at least one inner tube, wherein the at least one inner tube is coupled to the at least one outer tube via at least one clamp positioned at a first end of the outer tube;
   the at least one clamp having at least an open position and at least a closed position, wherein the at least one inner tube is telescopically coupled to the at least one outer tube such that at least a portion of the at least one inner tube slides within the at least one outer tube when the at least one clamp is in the open position and the inner tube is securely fastened relative to the at least one outer tube when the at least one clamp is in the closed position;
   the at least one inner tube having a first inner tube end comprising an inner end cap, and the at least one outer tube having a second end comprising an outer end cap;
   at least two inner legs coupled to the inner end cap such that the at least two inner legs rotate on a plane normal to a radius of the at least one inner tube;
   at least two outer legs coupled to the outer end cap such that the at least two inner legs rotate on a plane normal to a radius of the at least one inner tube;
   wherein the inner end cap comprises at least two inner end cap bosses configured to couple the at least two inner legs to the inner end cap; and
   the outer end cap comprises at least two outer end cap bosses configured to couple the at least two outer legs to the outer end cap.

2. The portable carrier device of claim 1 further comprising:
   a relief slot formed in the at least one outer tube extending away from the first end of the outer tube along at least a portion of a length of the at least one outer tube, the relief slot configured to allow the at least one clamp to reduce the diameter of the at least one outer tube such that the at least one outer tube and at least one inner tube are securely fastened relative to one another when the at least one clamp is in the closed position.

3. The portable carrier device of claim 2 wherein:
   the relief slot is formed within a relief strip that forms a portion of the circumference of the at least one outer tube for at least a portion of the length of the at least one outer tube.

4. The portable carrier device of claim 1 wherein:
   the at least one clamp substantially encircles the first end of the outer tube; and
   the at least one clamp comprises at least two tabs, each of the at least two tabs having a first threaded hole configured to cooperate with a first threaded knob such that the first threaded knob may be twisted to move the at least one clamp between the open position and the closed position.

5. The portable carrier device of claim 1 wherein:
   the at least two inner end cap bosses each comprise an inner end cap hole that cooperates with an inner leg hole formed in each of the at least two inner legs such that a threaded inner leg knob may securely fasten one of the at least two inner legs to a respective one of the at least two inner end cap bosses; and the at least two outer end cap bosses each comprise an outer end cap hole that cooperates with an outer leg hole formed in each of the at least two outer legs such that a threaded outer leg knob may securely fasten one of the at least two outer legs to a respective one of the at least two outer end cap bosses.

6. The portable carrier device of claim 1 further comprising:
at least one elastic inner grommet securely fastened within the at least one inner tube and adjacent the inner end cap, wherein the at least one elastic inner grommet is configured to retain a hose in position relative to the at least one inner tube via a first central orifice within the at least one elastic inner grommet.

7. The portable carrier device of claim 1 further comprising:
at least one elastic outer grommet securely fastened within the at least one outer tube and adjacent the outer end cap, wherein the at least one elastic outer grommet is configured to retain a hose in position relative to the at least one outer tube via a second central orifice within the at least one elastic outer grommet.

8. The portable carrier device of claim 1 wherein:
each of the inner end cap and outer end cap comprises at least one securement arch configured to accommodate a strap for securing the portable carrier device to a vehicle.

9. A portable waste hose carrier comprising:
an outer tube and an inner tube, wherein the inner tube is coupled to the outer tube via a first clamp positioned at and substantially encircling a first end of the outer tube;
the first clamp having at least an open position and at least a closed position, such that the inner tube slides telescopically within the outer tube over at least a portion of the length of the inner tube when the first clamp is in the open position and the inner tube being securely fastened relative to the outer tube when the first clamp is in the closed position;
the inner tube having a first inner tube end inserted into an inner end cap, and the outer tube having a second end inserted into an outer end cap;
a plurality of legs rotatably coupled to the inner end cap and the outer end cap; and
the first clamp comprises at least one clamp boss configured to be coupled to one of the plurality of legs.

10. The portable waste hose carrier of claim 9 wherein:
a relief slot is formed within a relief strip that forms a portion of the circumference of the outer tube for at least a portion of the length of the outer tube, and the relief slot extends away from the first end of the outer tube along at least a portion of a length of the outer tube.

11. The portable waste hose carrier of claim 9 wherein:
the first clamp comprises at least two tabs, each of the at least two tabs having a first threaded hole configured to cooperate with a first threaded knob such that the first threaded knob may be twisted to move the first clamp between the open position and the closed position.

12. The portable waste hose carrier of claim 9 wherein:
at least two inner end cap holes are formed in the inner end cap and the first inner tube end inserted into the inner end cap such that a threaded inner leg knob securely couples at least two of the plurality of legs to the inner end cap; and
at least two outer end cap holes are formed in the outer end cap and the second end of the outer tube inserted into the outer end cap such that a threaded outer leg knob securely couples at least two of the plurality of legs to the outer end cap.

13. The portable waste hose carrier of claim 12 wherein:
at least two inner bosses are formed on the inner end cap, and each of the at least two inner end cap holes extend through a respective one of the at least two inner bosses; and
at least two outer bosses are formed on the outer end cap, and each of the at least two outer end cap holes extend through a respective one of the at least two outer bosses.

14. The portable waste hose carrier of claim 9 further comprising:
at least one elastic inner grommet securely fastened within the inner tube and adjacent the inner end cap, wherein the at least one elastic inner grommet is configured to retain a hose in position relative to the inner tube via a first central orifice within the at least one elastic inner grommet.

15. The portable waste hose carrier of claim 9 further comprising:
at least one elastic outer grommet securely fastened within the outer tube and adjacent the outer end cap, wherein the at least one elastic outer grommet is configured to retain a hose in position relative to the outer tube via a second central orifice within the at least one elastic outer grommet.

16. The portable waste hose carrier of claim 9 wherein:
each of the inner end cap and outer end cap comprises at least one securement arch configured to accommodate a strap for securing the portable carrier device to a vehicle.

* * * * *